United States Patent [19]

Anderson et al.

[11] Patent Number: 4,938,591

[45] Date of Patent: Jul. 3, 1990

[54] METHOD AND APPARATUS FOR ELECTRONIC AND VISUAL IMAGE COMPARING

[75] Inventors: Norman G. Anderson, Rockville, Md.; Norman L. Anderson, Washington, D.C.

[73] Assignee: Large Scale Biology Corporation, Rockville, Md.

[21] Appl. No.: 273,702

[22] Filed: Nov. 8, 1988

Related U.S. Application Data

[62] Division of Ser. No. 49,982, May 15, 1987.

[51] Int. Cl.$^5$ .............................................. G01B 11/00
[52] U.S. Cl. ...................................... 356/73; 356/389; 356/394
[58] Field of Search ......................... 356/73, 389, 394

[56] References Cited

U.S. PATENT DOCUMENTS

| | | | |
|---|---|---|---|
| 3,436,473 | 4/1969 | McMann, Jr. | 356/73 |
| 3,565,534 | 2/1971 | Chaban | 356/389 |
| 3,930,735 | 1/1976 | Kerr | 356/389 |
| 4,521,074 | 6/1985 | Kalaugher | 356/389 |

Primary Examiner—F. L. Evans
Attorney, Agent, or Firm—Venable, Baetjer, Howard & Civiletti

[57] ABSTRACT

The invention relates to a method and apparatus for acquiring, recording and storing information in photographic and electronic media. In particular, the invention relates to low flare image recording and specifically to recording two-dimensional images, such as are found in electrophoretic patterns, along with associated alpha-numeric information. An optical comparator is also disclosed. A method and apparatus of optically and electronically comparing images on film strips is disclosed.

9 Claims, 7 Drawing Sheets

METHOD AND APPARATUS FOR ELECTRONIC AND VISUAL IMAGE COMPARING

This application is a division of application Ser. No. 049,982, filed May 15, 1987.

BACKGROUND OF THE INVENTION

1. Field of the Invention

The invention relates to a method and apparatus for acquiring, recording and storing information in photographic and electronic media. In particular, the invention relates to image recording and specifically to recording two-dimensional images, such as are found in electrophoretic patterns, along with associated alphanumeric information. A method and apparatus of comparison of images is disclosed.

2. Description of the Prior Art

Electrophoresis is an electrochemical process in which colloidal particles or macromolecules having a net electric charge migrate in a solution under the influence of an electric field. The process is widely accepted and used, resulting in an enormous body of information and data.

Biological mixtures, such as proteins or nucleic acids (DNA or RNA) are often separated by electrophoresis in flat gels, yielding either a one-dimensional train or ladder of bars, or a two-dimensional pattern of spots. In either case, the result is a flat pattern to be analyzed visually or by computerized methods.

The gels containing the primary information, that is, the image pattern, are fragile. Accordingly, a photographic record is usually made for archival purposes, typically for reference or for use as an illustration in a scientific publication. In some instances, the photograph is part of the documentation for diagnostic records, or it may be part of a new drug application. In addition, a high resolution electronic image may be made from the image pattern for record-keeping and research purposes.

Because of the tremendous amount of information generated photographically and electronically, good record keeping is essential. Typically, among the requirements of good record keeping are positive image identification and inclusion in the photographic image of identifying and descriptive information pertaining to the image. The information depicted in the photograph, including the identifying and descriptive information, may be computer-stored as a retrievable digital image. If image analysis is performed on the pattern, the resulting image analysis data may also be retrievably stored.

It is important that the image recorded be accurate and clear because, once the gel is disposed of, the only source of information is the photographic or electronic image. The characteristics of gel images create special lighting problems which make reproduction of the images difficult. For example, a major portion of the field in a gel image is transparent. Thus, the amount of light necessary to adequately illuminate the image often produces a flare or excessive brightness which overwhelms the small spots which constitute the image, whereby the information contained in the image may be lost and the dynamic range recorded is reduced.

When it is desired to make both electronic and photographic reproductions of the gel image, separate, multistep processes are required. However, the fragility of the gel medium, coupled with the multi-step processes, makes it difficult to handle a great number of images at any one time. Also, if great care is not taken, it is possible to destroy the gel before the information is acquired.

Typically, the information contained in a pattern is cross-checked and compared with the information in other similar or diverse patterns. Thus, ease of retrieval enabling inter-comparison is an important and desirable feature of any recording and storage system.

In order to illustrate the importance of a simple, efficient and accurate system, it is instructive to consider construction of the Human Protein Index, in which hundreds of thousands of two-dimensional electrophoretic patterns must be analyzed, or sequencing the DNA of the entire human genome which will ultimately require the analysis and storage of data from many millions of gels. For either of these projects an automatic, efficient and accurate system for acquiring, recording and storing the information associated with these gels is essential if significant progress towards analysis of the primary information is to be made.

Prior art systems have not comprehensively addressed the foregoing problems. The importance of the present invention lies in its comprehensive approach to satisfying the record-keeping requirements associated with photographic reproduction and electronic imaging of large numbers of fragile images. The system permits simultaneous photographic recording and electronic imaging and storage using an optical system compatible with photographic and electronic media. Recording is accomplished in one or a few steps, and a simple method of image storage, retrieval and inter-comparison is provided.

SUMMARY OF THE INVENTION

The invention provides a method and apparatus for photographically and electronically acquiring, recording and storing a data image and information, including text and identification images, associated with said data image in photographic and electronic media.

The apparatus includes means for photographing the data image on film; means for generating and displaying a text image associated with the data image from stored data in response to a call for the text; means for photographing the text image associated with the data image on the film in proximity to the data image; means for generating an identification image or indicia associated with the data image from stored data in response to a call for the identification image; means for recording onto the film machine and/or human readable identification indicia to identify the image and associated text; and means for electronically acquiring the image and retrievably transmitting the image to storage in association with said associated stored data.

The method of the invention includes the steps of photographing the data image onto the film; calling up from storage and displaying text associated with the data image; photographing the text onto the film; calling upon from storage and generating identification indicia associated with the text and data image; marketing the film with the identification indicia; and electronically acquiring the data image and retrievably transferring the data image to storage in association with the text and identification images. In one embodiment, the steps are accomplished nearly simultaneously in at least one scan pass of the data image.

In another embodiment, method and apparatus for optically and electronically comparing and storing images are described. The apparatus includes film transport means for moving images on each of a plurality of film strips into a viewing position and a scanning position. Means are provided to illuminate the film at each of the viewing and scanning positions. Optical and electronic means are provided to optically view superimposed and side-by-side images and electrically scan and store said images. The method includes transporting film strips separately to viewing and scanning locations, illuminating the film strips and viewing and scanning and storing the images in side-by-side and superimposed configurations.

DETAILED DESCRIPTION OF THE PREFERRED EMBODIMENT

The following are definitions of some of the terms used throughout the disclosure:

The term "image" refers to electrophoresis gels, either one-or two-dimensional, to autoradiographs, to text, to identification indicia, or to any other material or information which is usefully recorded both photographically and electronically.

"Electronic scanning" refers to the use of means such as diode arrays or charge-coupled devices consisting of a series of photosensitive elements to allow densitometric readings to be made along a scan line.

"Flare" is the scattering of light in an optical system due to dust, diffraction, or scatter off any surface or in any component which contributes to non-linearity in response and to the loss of dynamic range or signal.

Figure 1:
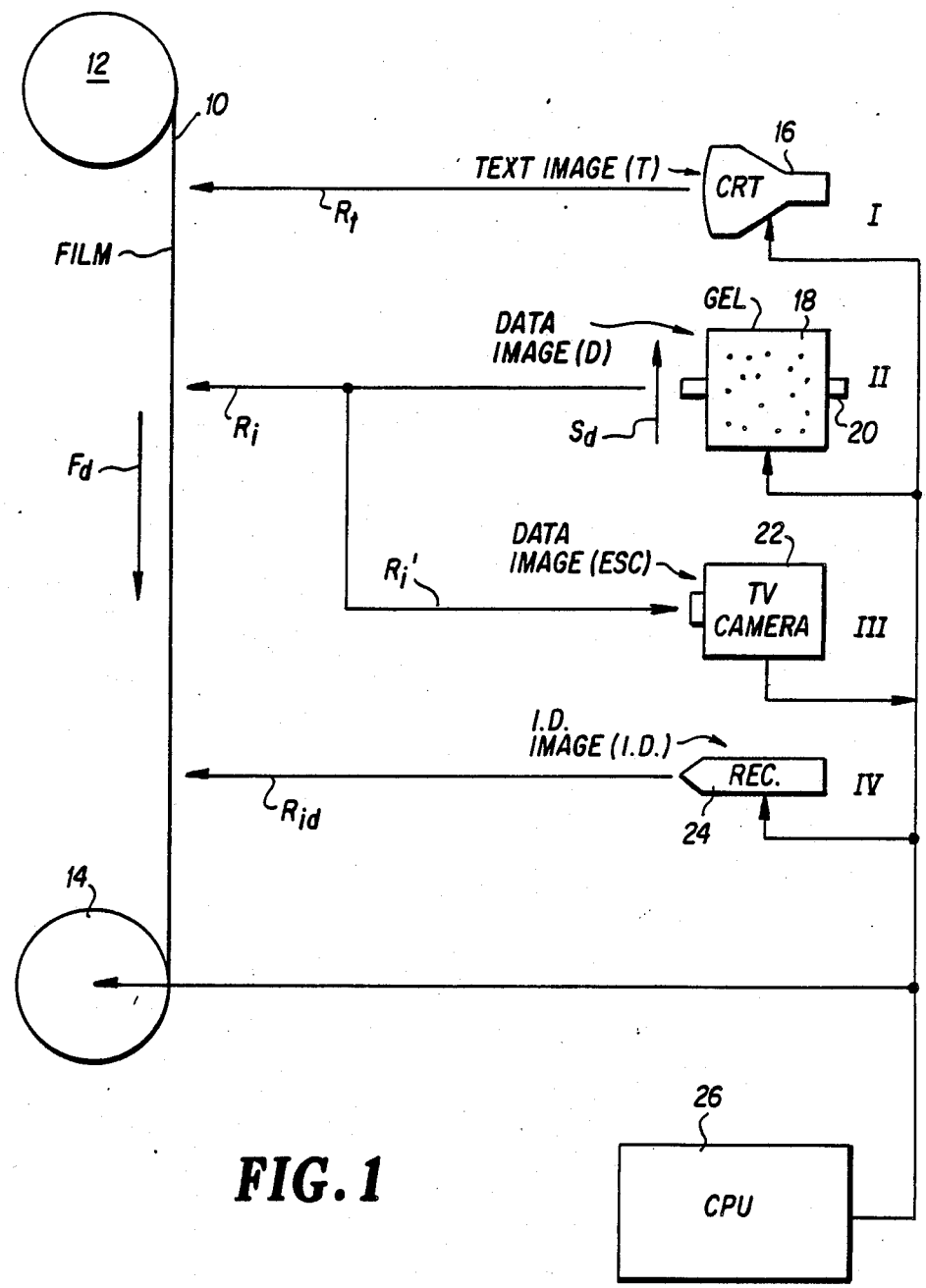
FIG. 1 is a schematic illustration of the series of steps carried out in one embodiment of the present invention.

FIG. 1 illustrates schematically the basic elements of the present invention, wherein, through a series of four steps, indicated symbolically as apparatus locations I–IV, respective text, data and identification images are acquired and recorded photographically and electronically.

A film 10 is carried between respective feed and takeup rolls 12 and 14. The film 10 is sequentially moved longitudinally in the direction of arrow $F_d$ from feed roll 12 to takeup roll 14. The text, data and identification images are recorded onto the film at locations I, II and IV.

At location I, a cathode ray tube (CRT) 16 displays text information in the form of a text image T called up from storage in a central processing unit (CPU) 26 by an operator.

A gel 18, at location II, contains thereon a configuration of lines or spots, as shown, representing a data image D to be recorded on the film. A slit light source 20 provides a slit source of intense light to illuminate a portion of the gel 18. In the embodiment shown in FIG. 1, the gel 18 is moved relative to the film 10 in the direction illustrated by the arrow $S_d$. In other embodiments hereinafter described, it will become clear that the direction of relative movement of the film 10, slit light source 20, and gel 18 may be varied in order to accomplish scanning and recording of the data image D onto the film 10 from the gel 18 in a variety of ways.

At location III, an electronic scanning camera 22 (shown in the drawing as ESC 22) is adapted to electronically capture an electronic representation of the data image D on the gel 18, and transmit the image to storage in the CPU 26.

At location IV, a recording device 24 is adapted to record onto the film 10 an identification image ID, in the form of machine and/or human readable indicia, in response to a call from storage in CPU 26 by the operator.

Movement of the film 10, text image display on the CRT 16, scanning of the gel 18 by the slit light source 20, operation of the electronic scanning camera 22, and operation of the recording device 24 are centrally controlled by the central processing unit 26.

In one embodiment of the present invention, the operator prepares a gel 18 which is supported on means (not shown in FIG. 1) for relative movement with respect to the light source 20 and the film 10. Once the gel 18 is prepared and located for recording of the data image D thereon, the operator, using an identification number or code (already on the gel), calls up from storage previously recorded text information about the gel 18 and displays the information in the form of text image T on the CRT 16. The text image T displayed on the CRT 16 is recorded at location I on the film 10 while both are stationary. Arrow $R_t$ indicates recording of the text image T at location I. The film 10 is thereafter advanced to location II whereupon the film 10, gel 18 and light source 20 are moved relative to each other to scan and project the data image D on the gel 18 towards the film 10. The data image D is recorded on the film 10 as indicated by the arrow $R_i$. At the same time, the data image D is deflected, by split imaging means (not shown in FIG. 1) toward the electronic scanning camera 22 at location III. Thus, the same data image D as appears in the gel 18 is scanned and acquired by the electronic scanning camera 22 as indicated by the arrow $R_i$ at location III. The data image captured by camera 22 is sent to storage in the CPU 26 at the same time that the data image D is being photographed onto the film 10 at location II. Thereafter, the film is advanced to location IV, whereupon a signal from the CPU 26 activates the recorder 24 to record an identification image ID onto the film 10 as indicated by the arrow $R_{id}$. Although shown sequentially at location IV, this identification number may also be recorded on the edge of the film while it is at location I, II or III.

It is possible that the photographic scanning of the gel 18 and the electronic acquisition of the data image D may be performed as separate steps, as hereinafter described. It should be understood, however, that the illustration in FIG. 1 and the accompanying description is illustrative of the contemplated process of the present invention whereby as much information as possible about the gel 18 is acquired and recorded at about the same time.

Figure 2:
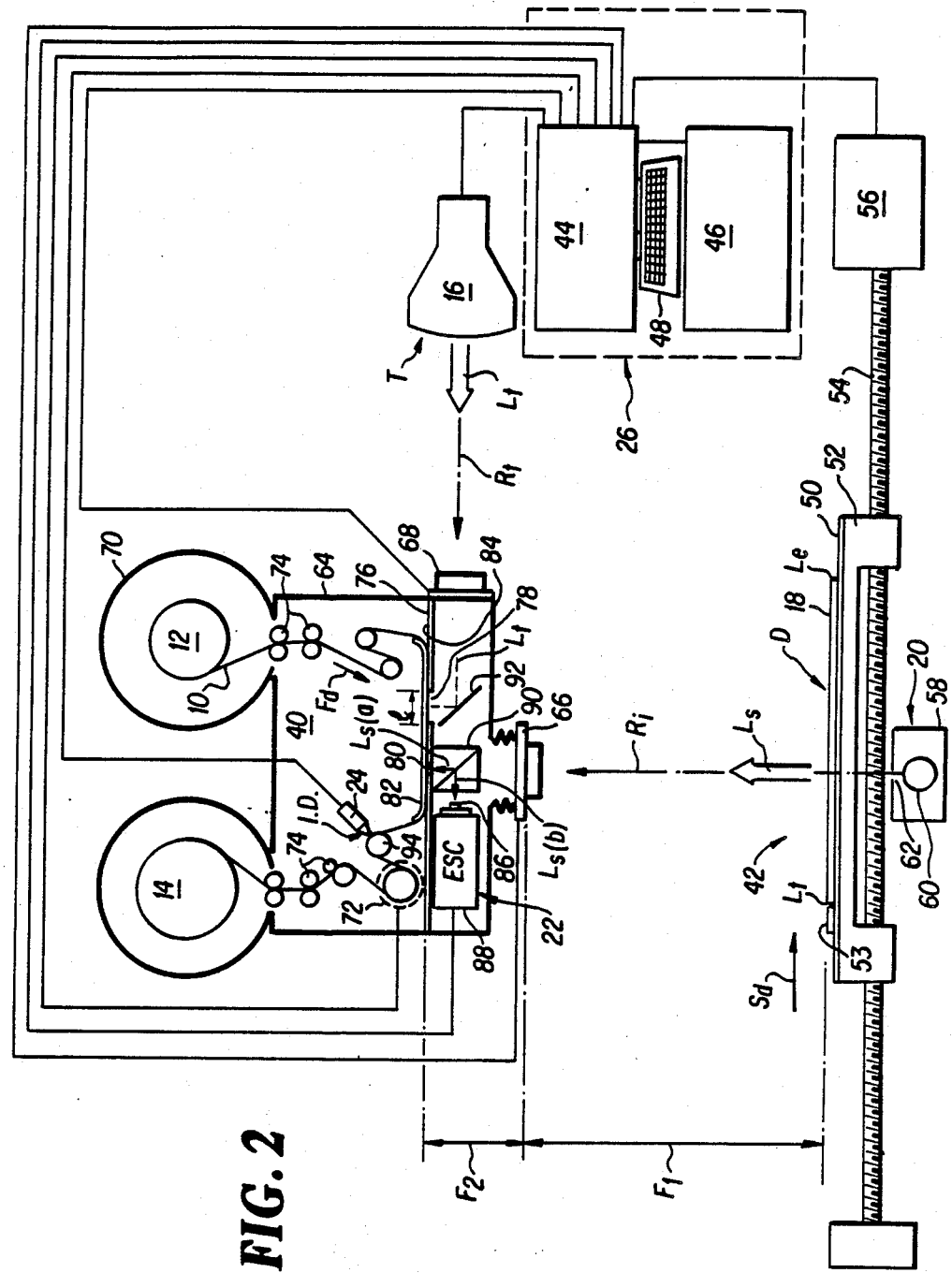
FIG. 2 is a more detailed schematic illustration of an apparatus for practicing the present invention.

A detailed illustration of one embodiment of the present invention is shown in FIG. 2. In the drawing, a scanner camera 40 is adapted to acquire and photographically record the text image T, the data image D, and the identification image ID. A movable scanner carriage 42 is adapted to carry and illuminate the gel 18 for recording the data image D thereon. CRT 16 is adapted to display the text image T. Recording device 24 produces the ID image. CPU 26, referred to in FIG. 1, includes a microprocessor 44, a storage device 46, and a keyboard entry device 48. The CPU 26 controls the operation of the camera 40, movement of the scanner carriage 42, the CRT 16, and the recording device 24.

The scanner carriage 42 for the gel 18 includes a clear glass support plate 50 and a movable table 52 mounted for reciprocal and lateral motion on lead screws 54, which are driven by a motor 56 in response to an output from the CPU 26. The motor 56 is preferably a phased-locked motor known in the art. In operation, a high resolution, two-dimensional gel 18 is loaded onto the scanner carriage 42. The gel 18 is illuminated by slit light source 20 which includes a stationary housing 58 and a high intensity bulb 60. The housing 58 has a lateral slit 62 which projects a band or slit of light $L_s$ from the light bulb 60 through the glass support plate 50 and through the gel 18 towards camera 40 in the direction of arrow $R_t$. The slit light source provides a narrow band of high intensity light $L_s$ which reduces flare.

The camera 40 includes a housing 64 having a first or main lens system 66 and a second lens system 68. The camera 40 has a film magazine 70 which houses the film 10 and the respective feed and takeup rolls 12 and 14, described briefly in connection with FIG. 1. The film 10 is transported from the feed roll 12 to the takeup roll 14 by means of a sprocketed drive roller 72 and a series of idler rollers 74. The housing 64 includes an apertured wall 76 having a relatively wide text image aperture 78 and a relatively narrow data image aperture or slit 80 as shown. A pressure plate 82 abuts the wall 76, and the film 10 is captured between the pressure plate 82 and wall 76 so that it lies in a focal plane 84 for the first and second lenses 66 and 68. The image aperture 80 is in the form of a slit which further reduces flare by allowing only a narrow exposure area on film 10 at any one time.

The electronic scanning camera 22 noted in FIG. 1 includes a photodiode array 86 and an electronics module 88 associated therewith. The photodiode array 86 provides a signal to the electronics module 88 which is conveyed to the CPU 26.

A beam splitting prism 90 is located in front of the data image slit 80. The band of light $L_s$ passes through the lens 66 and is split by the beam splitting prism 90 so that the optical information is transmitted to the film 10 through the data image slit 80 as light beam $L_s(a)$ and to the photodiode array 86 as light beam $L_s(b)$. When the data image D is in proper focus, the data image is located at a distance $F_1$ from the lens 66 and focal plane 84 is located at a distance $F_2$ from the lens. Distances $F_1$ and $F_2$ are called focal distances.

A front surface mirror 92 is located in back of the second lens system 68 for directing optical information as light beam $L_t$ in the direction of arrow $R_t$ onto the film 10 through the text image aperture 78.

The recording device or optical recorder 24, controlled by the CPU 26, optically records onto the film 10 machine and/or human readable identification indicia as the film 10 passes over recording idler 94.

The system acquires and records optional information in four different operations, as follows. The operator first prepares a gel 18 and locates the gel on the glass plate 50. The operator reads identifying information in the form of human or machine readable code on the gel 18 and keys the information into the CPU 26 via the keyboard 48 or by other appropriate means (e.g., a bar code scanner). Information previously held in storage 46 is called up and displayed on the CRT 16. The information displayed on the CRT is the text image T. At this time the film 10 is stationary and a shutter (not shown) in the lens 68 facing the CRT 16 is activated by CPU 26. The optical information displayed on the CRT 16 is photographed on the film 10 via the mirror 92 and text image aperture 78. The length l of the text image aperture 78 represents the lengthwise frame size of the text image.

After the text image T is photographed, the film 10 is advanced in the direction of the arrow $F_d$ towards the data image slit 80. The movable table 52 is initially positioned to the extreme left in FIG. 2 with the slit aperture 62 located directly below the leading edge $L_e$ of the gel 18. As the film 10 is advanced smoothly and evenly past the data image slit 80, a shutter (not shown) in the lens 66 is opened by CPU 26 and the high intensity lamp 60 is activated, projecting slit light beam $L_s$ through the gel 18, through prism 90 as beam $L_s(a)$, and toward the film 10. The film 10 advances in the direction $F_d$ at speed $V_f$ by means of the sprocketed drive 72. The gel 18 moves at speed $V_g$ in the direction $S_d$ by means of the motor 56 acting through the lead screw 54. The film 10 and gel 18 move at relative speeds $V_f$, $V_g$ which are in the same ratio as the focal distances $F_1$ and $F_2$, that is, $F_1:F_2=V_g:V_f$. Image scanning and photographing of the data image D occurs as the gel 18 is scanned from the leading edge $L_e$ to the trailing edge $L_t$. It is also important that the film 10 is evenly and smoothly moved relative to the gel 18' so that image magnification or reduction is the same in both the direction of the film $F_d$ and the direction normal to the plane of the drawing, so that the image is not blurred.

It should be understood that an image of almost any length in the direction $F_d$ may be recorded because the image and the film may be moved during film exposure.

At the same time that the data image D is photographed, the light beam $L_s$ representing the data image is split by the prism 90 and one of the split beams $L_s(b)$ is directed toward the photodiode array 86 and electronics module 88. As the movable table 52 is moved from left to right as aforesaid, the optical information carried by the light beam $L_s(b)$ is captured or acquired by the photodiode array 86 and the electronics module 88. Information representative of the data image D is transmitted to the CPU 26 and into storage 46.

The light beam $L_s(b)$ is focused onto the photodiode array 86 by proper positionment of the array 86 relative to lens 66 or by other means not shown. It is important that the data image D is properly focused on the film 10 and photodiode array 86 so that both photographic and electronic acquisition of the image occurs simultaneously.

The beam splitting prism is designed so that the light $L_s$ is split as shown into beams $L_s(a)$ for the film 10 and $L_s(b)$ for the electronic scanning camera 22 in such a way that each respective beam is optimized. In other words, the beam $L_s(a)$ has an intensity adapted to best expose film 10 and the beam $L_s(b)$ is of a character best adapted to activate the photodiode array 86.

The electronic scanning camera 22 may also include focusing and light attenuating means (not shown) to optimize the exposure of the photodiode array 86, and such means may be controlled by the CPU 26 in response to the information obtained from the electronic scanning camera, the operator, or the data image itself.

For example, scan data from a sharp reference edge in the plane of the data image may be compared with stored data commensurate with a sharp edge, and the lens 66 may be adjusted until the actual data and stored data match, whereby proper focusing is achieved. Proper exposure for obtaining densitometric control may be accomplished by means of absorbance step wedges 53 located on the moving table 52. The step wedges 53 have known absorbancies so that the response of the electronic scanning camera 22 and lens system 66 may be measured, calibrated and controlled. Light passing through lens 66 may be controlled by manually adjusting the f-stop of the lens 66 in a known manner. Alternatively, f-stop control may be effected by the CPU 26 in accordance with a suitable command, or automatically in response to signals from photodiode array 86.

The recording head 24, in the form of a focused light source, modulated by signals produced in the CPU 26, generates the identification image ID in human and/or machine readable form by exposing the film 10. The identification image ID is recorded at some appropriate location on the film 10 near the photographed text image T and data image D.

After all the images have been acquired and recorded, the gel 18 is removed from the movable table 52 and the components are respositioned so that another gel may be photographed.

Figure 3:
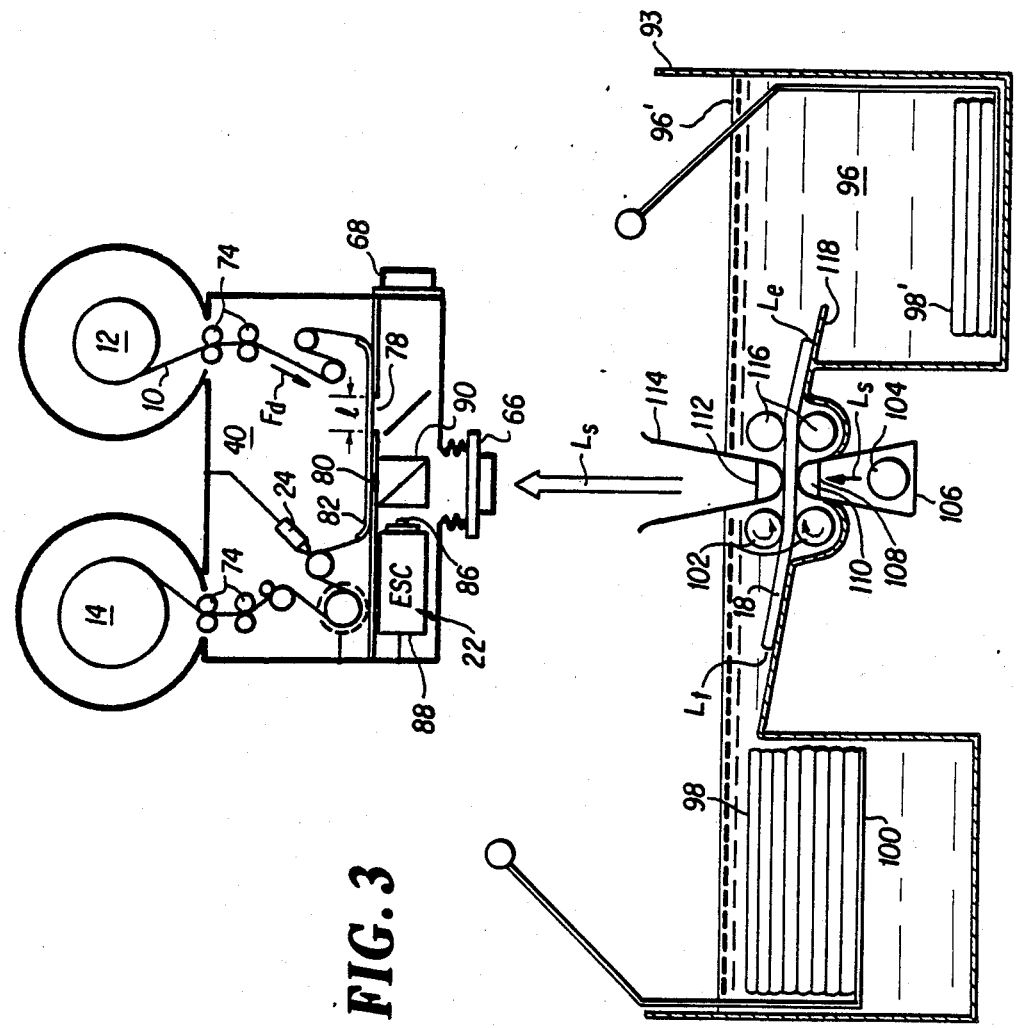
FIG. 3 is a schematic illustration of the apparatus shown in FIG. 2, with some control elements deleted and an alternate form of a scanning mechanism illustrated.

In another embodiment of the invention, shown in FIG. 3, the gel 18 is scanned under water. The arrangement in FIG. 3 eliminates the possibility of air bubbles being trapped under the gel 18 causing a distortion of the image or other anomaly. The gel 18 is scanned in a tank 93 containing water 96. One or more gels 18 to be scanned are located in an in-feed gel stack 98 on feed-gel holder 100 which is raised as the gels 18 are fed, by a mechanism not shown. The gel 18 being scanned passes between the nip of drive rollers 102 which have a fine surface grit to enhance friction. The rollers 102 are driven at the same speed in opposite directions as shown.

A tubular or elongated light source 104 is contained within a waterproof enclosure 106 having a transparent slit window 108 in upper end 110. A transparent bar 112, set in a leak-tight enclosure or shroud 114, allows the light $L_s$ passing through the slit 108 to pass up to the camera 40, which is the same as that shown in FIG. 2. The shroud 114 extends above the surface 96' of the water. This arrangement shields the light $L_s$ passing through gel 18 from disturbances due to irregularities in the surface 96' of the water.

The scanned gel 18 passes between downstream rollers 116 and slides off an inclined slide 118 onto downstream gel stack 98'. The gels 18 may be fed through the system by hand or by an automatic gel advancement mechanism (not shown).

In accordance with the invention, the text image T is recorded in the same fashion as described with respect to FIG. 2. As the gel 18 is inserted between the drive rollers 102, the operator starts the second part of the scanning cycle, the photography of the text having been completed as aforesaid. The movement of the film 10 is started, a shutter (not shown) in the lens system 66 is opened, and the film 10 and gel 18 advance in opposite directions at speeds related to their focal distances. Termination of the scan cycle is preset to conform with the length of the gel 18 from the leading edge $L_e$ to the trailing edge $L_t$. Termination of the cycle can, for example, occur at the end of a given number of revolutions of the drive rollers 102 signifying a certain circumferential distance corresponding to the length of the gel 18.

Simultaneously with the scan photographing of the data image onto the film 10, electronic acquisition and signal transmission to the CPU (not shown in FIG. 3) is accomplished in the same manner as aforesaid with respect to FIG. 2.

Figure 4:
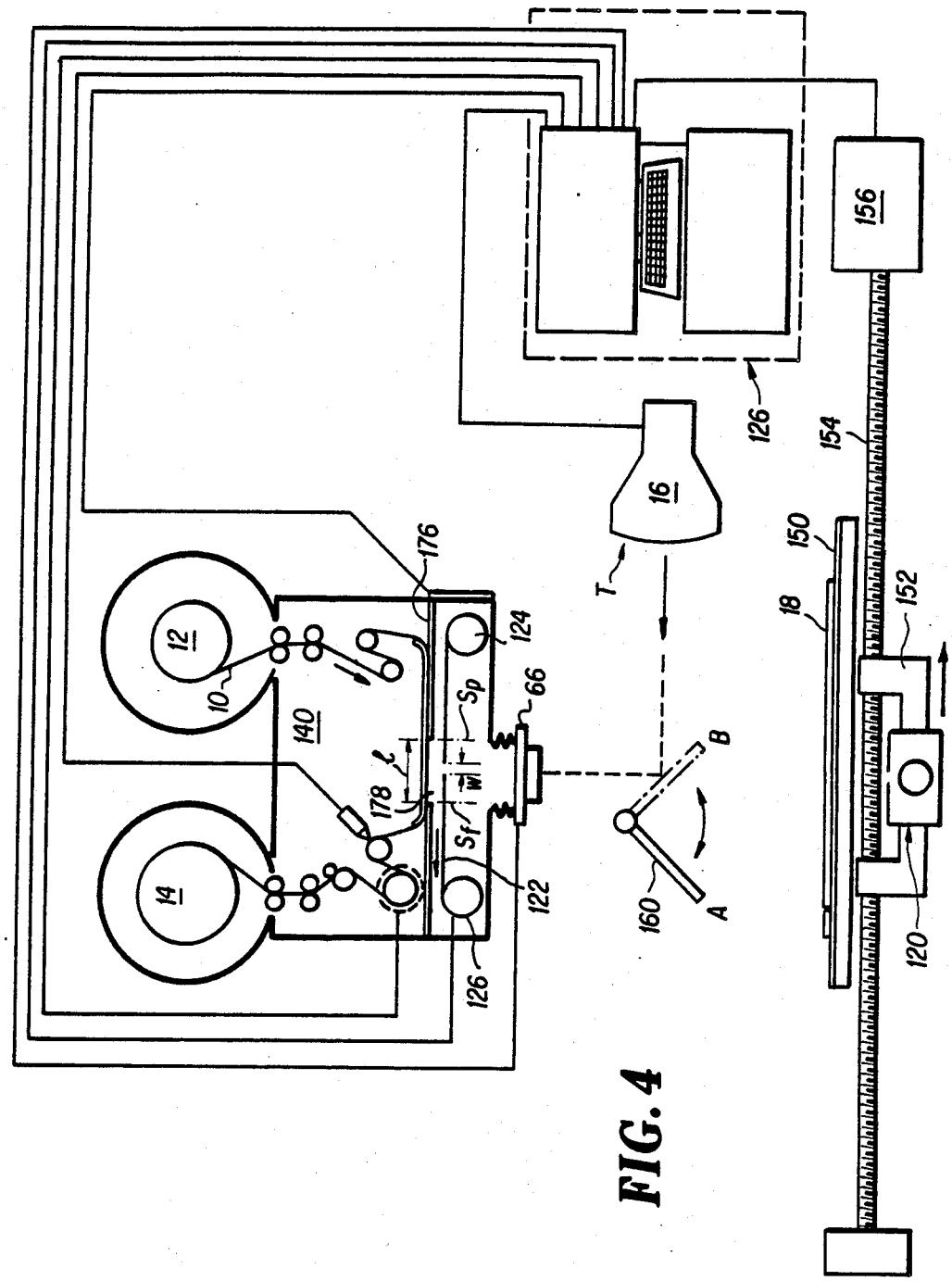
FIG. 4 is an illustration of an apparatus for practicing the present invention using a double scanning sequence.

A simplified system in which electronic scanning is done later on the film negative (or a positive print), is shown in FIG. 4. In this embodiment, a modified camera 140 and the gel 18 remain stationary. A movable slit light source 120 is mounted on a carriage 152 and lead screws 154. The lead screws 154 are driven by motor 156 in response to a control from the CPU 26. In this case, the gel support 150 remains stationary.

The camera 140 has one lens 66 and a movable focal plane shutter 122 having slit 124. The focal plane shutter 122 is driven by motor 126, between respective start and finish positions $S_p$ and $S_f$, shown in the drawing. The respective start and finish positions $S_p$ and $S_f$ correspond with the length l of a data image aperture 178 in optical plane 176. As the movable slit light source 120 scans the gel 18 from left to right, the focal plane shutter 122 moves from right to left and the film 10 remains stationary.

A mirror 160 may be moved from the retracted position A to the text insertion position B, shown in dotted lines. Movement of the mirror 160 may be manually or mechanically effected by suitable means not shown. When the mirror 160 is located in the text insertion position B, the text image T is called up on the CRT 16 and is projected through the lens 66 onto the stationary film 10 as the focal plane shutter 122 is moved between positions $S_f$ and $S_p$. Focal plane shutter 122 may have a width dimension W which is adjustable to vary the exposure of the film 10.

The arrangement shown in FIG. 4 is a simplified version of the invention in which the camera 140 and the gel 18 are in fixed relationship with each other and the light source 120 and focal plane shutter 122 move in fixed relationship with each other for scanning the gel 18 and projecting the scanned image onto the film 10. With the alternative arrangement shown in FIG. 4, it is difficult to incorporate the electronic scanning camera 22 (FIGS. 1–3). Thus, electronic scanning may be done on the photographic negative (or positive) of the film 10 at a later time.

It is also possible, although not shown in the drawings, to move the entire camera scanner including the slit light source (e.g., 40 and 58, FIG. 1) relative to a fixed gel, with the film transported evenly and proportionately in the opposite direction from the scanner movement to produce a low-flare image.

It is also feasible to photograph and scan in one pass using two separate slit light sources, a separate photographic camera and a separate electronic camera, mounted for movement along the gel scanner transport (e.g., lead screws 54, FIG. 1). These should be shielded from each other so that no cross illumination occurs.

In accordance with the present invention, there has been provided an integrated computerized control system for operating a scanner camera adapted to photographically and electronically acquire, record, and store a data image, text associated with the data image, and identification information associated with the data and text images. The method of the present invention includes the steps of calling up from storage text information which is associated with the data image, displaying the text as an image, and photographing the text image onto the film. In one embodiment of the invention, the film is thereafter advanced into alignment with a slit illumination scanner and the method further includes moving the image, the film, and the slit illumination source relative to each other and simultaneously exposing the film for photographing the image thereon. Likewise, in one embodiment, simultaneously with the photographic scanning as aforesaid, the method includes splitting the slit illumination image and directing the same at a photodiode array to generate electronic signals representative of the data image for transmission to storage. Simultaneously with the foregoing or thereafter, the method includes calling up an identification signal from storage and recording the identification signal onto the film. The stored identification signal, text, and electronically acquired data image are retrievably stored in electronic media.

In accordance with the invention, it is intended that high resolution line-by-line electronic scanning be accomplished by providing maximum useful light intensity without producing flare. In the present invention, flare is reduced by using a slit light source 20. At low light levels, the photodiode array associated with the electronic scanning camera requires a longer scan time in order to properly integrate the incoming light. As the light intensity is increased, the time interval required for each scan is reduced. High resolution is achieved when the area scanned (picture element or pixel) by each scanning element is effectively square, with a little overlap as possible between consecutive scan lines. If the image movement speed is such that the image moves the equivalent of one scan line width between each scan, then light is integrated by each element as its center moves the equivalent of one pixel width, and each measurement of integrated light will be averaged across two pixels in a forward direction.

Figure 5A:
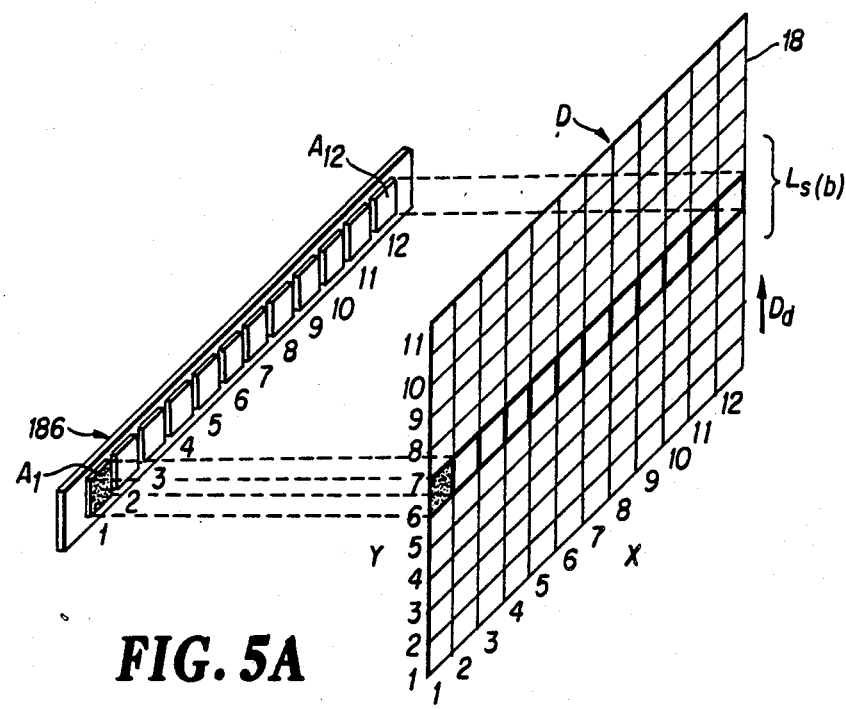
FIGS. 5A-5D are schematic illustrations showing various scanning techniques using different scan times and different photodiode array configurations.

For image analysis purposes, it is desired that optical absorbance measurements be made of equally spaced square areas on the image D of gel 18. The image D is projected on a photodiode array 186 including array elements $A_1$-$A_{12}$ shown in FIG. 5A. Because of the slit illumination only part of the gel image $L_s(b)$ is actually projected through the optical system at any given instant. Areas on the image D whose absorbance is to be measured are indicated as squares or pixels, and each pixel may be designated by its position on the X and Y axes shown. At the instant captured, pixel X1, Y6 in FIG. 5A is projected on array element $A_1$, and light from other pixel areas in the line X2-X12, Y6 are projected on elements $A_2$-$A_{12}$, respectively.

In practice, the image D in FIGS. 5A-5D moves in a direction relative to the array 186 in the upward direction shown by arrow $D_d$. The array 186 integrates light from the gel 18 over a period of time $t_i$ (hereinafter integration time). After integration, all elements $A_1$-$A_{12}$ are rapidly scanned or interrogated electronically, and the data is transferred to memory over a period $t_s$ (hereinafter scan time).

Figure 5B:
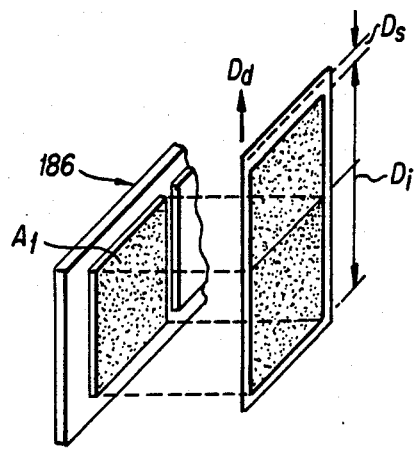

Integration time $t_i$ depends in part on the illumination level, and may be shorter the higher the illumination level. Scan time $t_s$ is usually very short relative to integration time $t_i$. As shown in FIG. 5B, the image D moving a distance $D_i$ relative to array element $A_1$ during the integration time $t_i$ includes slightly less than the length of two image plane pixels resulting in "smearing" of the data. The reason slightly less than two image plane pixels are integrated during the exposure interval is that the image moves a small distance $D_s$ during the period when the individual elements $A_1$-$A_{12}$ are being interrogated or scanned, and the photoelements are slightly smaller than the image pixel size. Note that the smearing occurs only in the direction of gel image movement $D_d$.

Figure 5C:
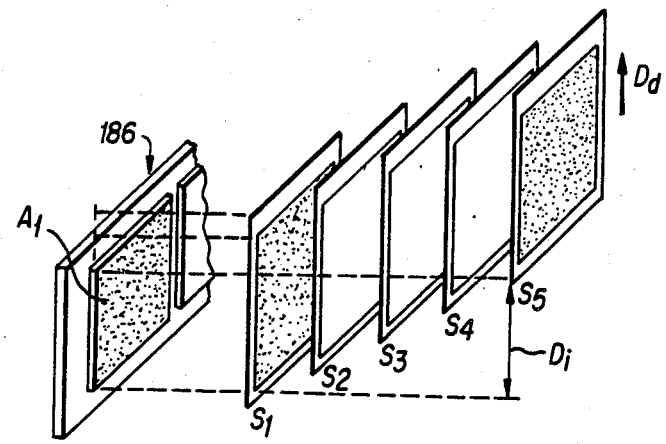

Smearing may also be diminished by increasing the scanning frequency without increasing the speed at which the projected gel images moves across the photosensitive elements $A_1$-$A_{12}$ as shown in FIG. 5C. If the scan rate is increased so that the projected gel image D moves one pixel length (a distance $D_i$) during four scans S1 to S5, and if only every fifth scan, i.e., S1 and S5, is stored, smearing is reduced to less than 25% of one pixel length.

Because the number of photoelements in photodiode arrays or CCDs is increasing with improved manufacturing techniques, it is possible to achieve the required resolution using improved photoelements which see only a fraction of a pixel. Photosensitive elements $A_{1a}$ and $A_{1b}$ (FIG. 5D) together scan one pixel length 1 in the direction $D_d$. If integration for each scan occurs twice over each pixel length 1, then every second scan S6, S8, will cover nearly one pixel, and there will be no overlap or smearing. The signals from $A_{1a}$ and $A_{1b}$ can be averaged, or only signals from alternate photoelements stored.

Figure 5D:
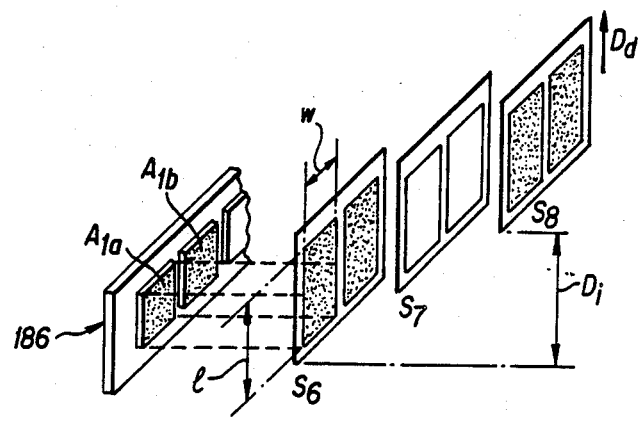

The last method for eliminating smearing may be produced by arrays which have sensitive elements which are twice as wide as long, and are able to achieve the effect shown in FIG. 5D using only one sensitive element per pixel, and storing every other scan.

Figure 6:
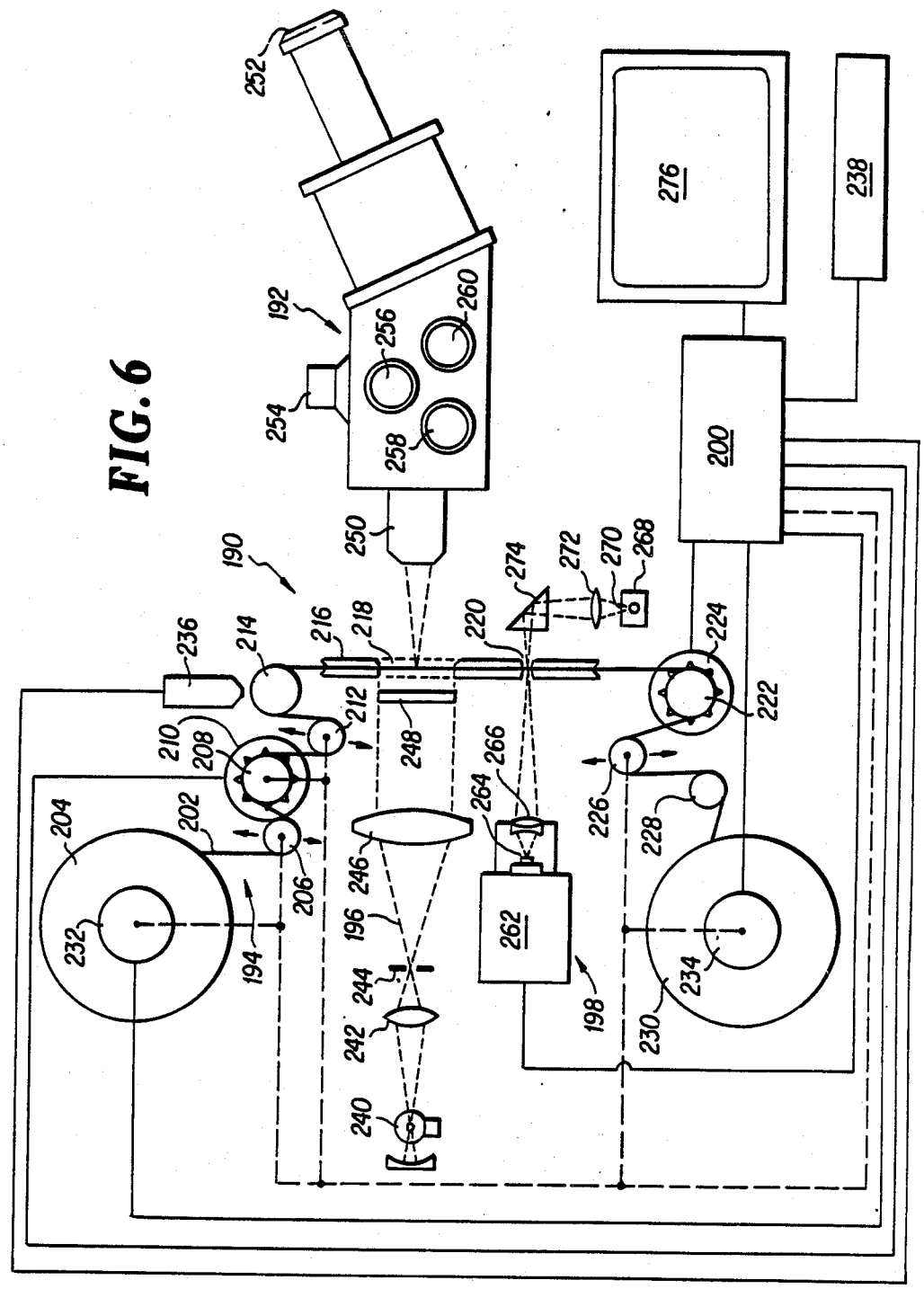
FIG. 6 is a schematic block diagram of an arrangement for comparing two photographed images.

In accordance with another feature of the invention, reference is directed to FIG. 6. Because not all laboratories will be equipped for massive electronic image analysis, data processing and data storage, gels may be scanned, photographed and electronically stored at locations separate from the analysis laboratory. In such cases, the resulting film may be shipped back to the particular investigator for use in his or her work. In some instances, an investigator will be interested only in a subset of gel spots followed through a large number of experimental gels. For such work it is important to have available to the investigator an optical comparator which allows any image from one roll of film to be compared with any image on a second roll of film.

An optical comparator 190 similar to that used in aerial mapping is illustrated in FIG. 6. The comparator 190 is adapted for use with positive prints of film supplied by apparatus described in FIGS. 1-4 above. The comparator 190 includes a pair of side-by-side film transport systems 194, illumination trains 196 and electronic scanners 198 (in FIG. 6 only one of each is shown). In addition, an optical viewer or binocular optical comparator 192 is provided for examining images on each film which may be optically superimposed on each other for comparison. A microprocessor 200 is provided which may be used to control film transport, scanning and illumination.

The comparator 190 allows the binocular observation of fused or superimposed images of the two gels being intercompared. The images are not initially superimposable because the gels are usually not identically oriented in each camera and because the gels may be stretched or distorted during processing. Hence, for best results, the optical comparator 190 should include means for moving images both vertically and horizontally under operator control, means for rotating one image relative to the other to align them, a zoom lens for changing the magnification of one image relative to the other and a variable rotatable cylindrical lens to allow one image to be stretched in any direction to achieve better superimposition. One optical system having such capabilities is a Bausch & Lomb, Zoom Transfer Scope Model ZT4-H which, when modified to look at side-by-side images, will perform as hereinafter described.

The images may be alternately illuminated or flickered to assist the eye in finding differences. Different colors of illuminating light may be used so that spots present in only one image will have a different hue from spots present in both. The required optical systems and the technique of flicker comparison are well known in the photogrammetric film analysis and astronomy arts. The necessary optical elements are widely available and have been applied to the analysis of individual electrophoresis gel photographs but not to the analysis of electrophoresis patterns recorded on strips of film.

The data recorded on the film is not only qualitatively useful, but contains quantitative data as well. It is therefore very useful to have a simple electronic scanner and image analysis system included in the comparator so that one may obtain quantitative data on individual spots found to be of interest.

A more detailed description of the comparator 190 is set forth below. The comparator 190 includes one binocular optical comparator 192, and two each of the film transport system 194, the illumination train 196 and the electronic scanner 198 which are located side-by-side into the page (only one of each is shown for simplicity). The comparator 190 is driven or controlled by microprocessor 200. Images projected by the comparator 190 are viewed by the binocular optical comparator 192.

Film 202 taken from roll or magazine 204 is fed over a tension-sensing idler 206, a motor-driven sprocket 208, reversibly driven by motor 210, a tension sensing idler 212, roller 214 and through a pressure gate 216 having image aperture 218 and slit aperture 220. The film 202 is fed through the pressure gate 216 over motor driven sprocketed roller 222, reversibly driven by motor 224, over tension sensing idler 226, and feed idler 228 to take-up film roll or magazine 230. Film rolls or magazines 204 and 230 are reversibly driven by respective drive motors 232 and 234.

Each gel image photographed on the film 202 has a respective bar code ID or other readable indicia (not shown) associated with it which may be read by an optical reader 236 as hereinbefore described.

A data entry device, such as a keyboard 238, may be used to input information into the microprocessor 200 so that an associated controller may selectively call up film segments by driving the film 202 using either motor 210 or 224 which control sprocketed rollers 208 and 222, respectively. Motors 210 and 224 are reversable and allow searching in both directions.

A variety of film direction and speed control systems may be employed to accurately move a segment of film 202 for viewing or for electronic scanning. In one embodiment, motor 224 driving sprocketed roller 222 is controlled by microprocessor 200 for reversibly driving the film 202 in both directions. In such an arrangement, tension sensing idler 206 controls the speed of motor 232; tensing sensing idler 212 controls the speed of motor 210; and tensing sensing idler 228 controls the speed of motor 234 (see the dashed lines schematically illustrating this control mode).

In the embodiment illustrated in FIG. 6, tension sensing idler 226 provides a signal which controls motor 234 for maintaining tension on the film 202 while the motor 234 winds the film in magazine 230 as it is moved by the sprocket 222. When the direction of film 202 is changed to an opposite direction, motor 234 plays out the film 202 at a speed determined by sensing idler 226 to maintain constant roller tension. In a similar manner, tension sensing idler 206 is used to control motor 232 to wind film 202 onto magazine 204 at the requisite speed or play out the film 202 at the proper speed when the film direction is reversed. Likewise, tension sensing idler 212 may be employed to control motor 210 to operate at a speed required to maintain constant tension on the film 202.

Alternatively, each motor 210, 224, 232 and 234 may be directly controlled by the microprocessor 200 in response to a variety of inputs including data from tension sensing idlers 206, 212 and 206 (see dashed lines illustrating the data feed back to microprocessor 200).

The film 202 positioned in aperture 218 is illuminated by optical train 196 including a lamp 240 which produces light collimated through lens 242, aperture 244 and lens 246. Diffuser 248 may be used, if desired, to soften the intensity of bulb 240. A color filter (not shown) may be used in addition to or in place of diffuser 248 to filter or alleviate selected wave lengths. Flickering between images may be done by alternating the on/off condition of the lamp 240 or by means of alternating shutters (not shown).

Binocular optical comparator 192, such as found in the Bausch & Lomb Model ZT4-H instrument referred to above, includes an objective lens 250 for each film train 194 directed at each of the apertures 218. The comparator 192 includes binocular eyepieces 252 for viewing both images so that they appear fused or superimposed. Controls for zoom 254, horizontal motion 256, cylindrical image stretching 258 and image rotation 260 adjust the orientation of one image relative to the other to optimize the fusion of the images.

When quantitative data is required, the film 202 is passed through the pressure gate 216 and slit aperture 220 whereby the film 202 is scanned by an electronic scanning camera (ESC) 262 which includes a photodiode array 264 and lens system 266. A slit light source 268 and aperture 270, a lens 272 and a deflecting prism 274 direct illumination shown in dotted lines through the slit aperture 220 toward the electronic scanning camera 262 as shown.

The film 202 may be moved continuously in synchrony with the scan of the electronic scanning camera 262 in accordance with the principles discussed with respect to FIGS. 5A-5D. It should be understood that discontinuous or line-by-line scanning is possible with all of the arrangements herein disclosed. However, mechanical and electrical equipment for discontinuously or intermittently moving the film or gels to be scanned is complex.

The processed image may be displayed on a CRT 276 coupled to the microprocessor 200 as shown.

The image captured by the electronic scanning camera 262 may be electronically stored and later called up for analysis. A variety of known techniques are available for analyzing images produced by means of the electronic scanning camera which are not detailed herein.

It should be understood that the system described herein may be adapted for use with non-perforated film should that be necessary.

The cameras illustrated in FIGS. 2-4 may be used as optical printers by methods known in the art. In one embodiment of the present invention, the camera 40 shown in FIGS. 2-4 may be based on a 70 mm film transport manufactured by Mekel Engineering Co. The film then may be 70 mm Eastman Technical Pan 2415 developed in Kodak HC-110 or D-76 developer to a contrast index around 1.0. The electronic scanners (FIGS. 2-4 and 6) each incorporate a photodiode array, such as an EG&G RL4096, with a 150 mm low-flare camera lens. The microprocessor (FIGS. 1, 2, 4 and 6) may be a Micro-Vax II manufactured by Digital Equipment Co. and the comparator (FIG. 6) may be a viewer from a Bausch & Lomb Model ZT4-H Stereo Transfer Scope.

While the invention has been disclosed by reference to the details of preferred embodiments, the disclosure is intended in an illustrative rather than in a limiting sense, at it is contemplated that modifications will readily occur to those skilled in the art, within the spirit of the invention and the scope of the appended claims.

What is claimed is:

1. An apparatus for electronically and optically comparing images on film, comprising:
   film transport means for moving images on at least two strips of film into an optical viewing position and an electronic scanning position;
   means for illuminating and projecting the images on each film at the viewing position and the electronic scanning position; and
   means for viewing the images at the viewing position in side-by-side and superimposed configuration;
   electronic scanning means for capturing the images at the scanning position; and
   means for storing the electronically captured images for image analysis and storage.

2. The apparatus in accordance with claim 1 further including processor means coupled to the film transport means and the electronic scanning means for controlling image positioning and electronic scanning of the images.

3. The apparatus in accordance with claim 2 wherein the film has identification indicia for identifying a corresponding image on the film and the apparatus includes means for reading the indicia on the film coupled to the processor means and the storage means for retrievably storing the indicia in association with the image which said indicia identifies.

4. The apparatus in accordance with claim 3 wherein the film transport means includes forward and reverse driving means for positioning film in the viewing position, the processor means governs the operation of the forward and reverse driving means in response to the means for reading the indicia on the film.

5. The apparatus in accordance with claim 1 further including means for adjusting the relative size, orientation and shape of one image relative to the other for providing accurate position and comparison of images.

6. The apparatus in accordance with claim 1 further including slit illumination means for illuminating the film and projecting such illumination towards the electronic scanning means for electronically capturing images on the film.

7. The apparatus in accordance with claim 1 including at least one of light diffusing and light filtering means for modifying the image at the viewing position.

8. The apparatus in accordance with claim 1 further including flicker comparison means for causing one image to be illuminated while the other adjacent image is darkened for allowing flicker comparison of the images.

9. A method for comparing images on strips of film comprising transporting the strips of film to selectively move the images to viewing and scanning locations; illuminating the images at the viewing and scanning locations; and retrievably storing the scanned images along with identification indicia on the film.

* * * * *